United States Patent
Zhang et al.

(10) Patent No.: US 11,849,502 B2
(45) Date of Patent: Dec. 19, 2023

(54) INTER-OPERATOR DEVICE-TO-DEVICE OPERATION

(71) Applicant: Nokia Technologies Oy, Espoo (FI)

(72) Inventors: Zhi Zhang, Beijing (CN); Kodo Shu, Shanghai (CN); Zexian Li, Espoo (FI); Juha Korhonen, Espoo (FI); Yixue Lei, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/302,294

(22) PCT Filed: Apr. 18, 2014

(86) PCT No.: PCT/CN2014/075697
§ 371 (c)(1),
(2) Date: Oct. 6, 2016

(87) PCT Pub. No.: WO2015/157995
PCT Pub. Date: Oct. 22, 2015

(65) Prior Publication Data
US 2017/0034686 A1    Feb. 2, 2017

(51) Int. Cl.
*H04W 8/00*    (2009.01)
*H04L 12/64*    (2006.01)
(Continued)

(52) U.S. Cl.
CPC ......... *H04W 8/005* (2013.01); *H04L 12/6418* (2013.01); *H04W 4/06* (2013.01);
(Continued)

(58) Field of Classification Search
None
See application file for complete search history.

(56) References Cited

U.S. PATENT DOCUMENTS

2004/0261116 A1    12/2004    McKeown et al.
2011/0258327 A1    10/2011    Phan et al.
(Continued)

FOREIGN PATENT DOCUMENTS

CN    103460760 A    12/2013
CN    103731826 A    4/2014
(Continued)

OTHER PUBLICATIONS

Office action received for corresponding Korean Patent Application No. 2016-7032114, dated Feb. 9, 2018, 6 pages of office action and no page of translation available.
(Continued)

*Primary Examiner* — Jenkey Van
(74) *Attorney, Agent, or Firm* — SQUIRE PATTON BOGGS (US) LLP

(57) ABSTRACT

Various communication systems may benefit from inter-operator device-to-device operation. For example, communication systems of the third generation partnership project (3GPP) long term evolution (LTE) advanced (LTE-A) release12/13 (Rel-12/13) or future releases may use such operation with respect to D2D communications. A method can include preparing, at a network element operated by an operator, radio resource information related to one or more operators other than the operator. The method can also include broadcasting, by the network element, the radio resource information. The radio resource information can be configured to permit a user equipment served by the network element to perform device-to-device discovery and/or communication with another user equipment served by at least one of the one or more operators.

20 Claims, 7 Drawing Sheets

(51) Int. Cl.
  *H04W 4/06* (2009.01)
  *H04W 48/16* (2009.01)
  *H04W 72/0453* (2023.01)
  *H04W 84/04* (2009.01)
  *H04W 88/02* (2009.01)

(52) U.S. Cl.
  CPC ....... *H04W 48/16* (2013.01); *H04W 72/0453* (2013.01); *H04W 84/042* (2013.01); *H04W 88/02* (2013.01)

(56) References Cited

U.S. PATENT DOCUMENTS

| | | | | |
|---|---|---|---|---|
| 2011/0317569 | A1* | 12/2011 | Kneckt | H04W 74/0833 370/252 |
| 2013/0288668 | A1* | 10/2013 | Pragada | H04W 12/06 455/426.1 |
| 2013/0324114 | A1* | 12/2013 | Raghothaman | H04W 8/005 455/426.1 |
| 2014/0099950 | A1* | 4/2014 | Mildh | H04W 76/14 455/434 |
| 2014/0130137 | A1* | 5/2014 | Baek | H04W 12/08 726/4 |
| 2014/0301307 | A1* | 10/2014 | Lee | H04L 5/0092 370/329 |
| 2014/0315562 | A1* | 10/2014 | Lim | H04W 8/005 455/450 |
| 2014/0342747 | A1* | 11/2014 | Lee | H04L 5/0053 455/450 |
| 2015/0045016 | A1* | 2/2015 | Xiong | H04W 8/005 455/426.1 |
| 2015/0156619 | A1* | 6/2015 | Fodor | H04W 8/005 455/434 |
| 2015/0312952 | A1* | 10/2015 | Fodor | H04W 72/1215 370/329 |
| 2015/0319745 | A1* | 11/2015 | Seo | H04W 76/14 370/329 |
| 2016/0143078 | A1* | 5/2016 | Jeong | H04W 28/0278 370/329 |
| 2016/0183212 | A1* | 6/2016 | Suzuki | H04W 16/14 370/330 |
| 2016/0295620 | A1* | 10/2016 | Lindoff | H04W 76/14 |
| 2016/0323868 | A1* | 11/2016 | Kalhan | H04W 72/1278 |
| 2017/0048902 | A1* | 2/2017 | Yamazaki | H04W 72/00 |
| 2018/0176892 | A1* | 6/2018 | Kim | H04W 52/04 |

FOREIGN PATENT DOCUMENTS

| | | | |
|---|---|---|---|
| EP | 1772994 | A1 | 4/2007 |
| EP | 3057368 | A1 | 8/2016 |
| JP | 2014-532372 | A | 12/2014 |
| JP | 2016-536853 | A | 11/2016 |
| KR | 2006-0123309 | A | 12/2006 |
| KR | 2007-0038927 | A | 4/2007 |
| KR | 2013-0127690 | A | 11/2013 |
| RU | 2503153 | C2 | 12/2013 |
| RU | 2661268 | C1 | 7/2018 |
| VN | 1-0028382 | B | 4/2021 |
| WO | 2013/055271 | A1 | 4/2013 |
| WO | 2013/088398 | A1 | 6/2013 |
| WO | 2013/109100 | A1 | 7/2013 |
| WO | 2013172755 | A1 | 11/2013 |
| WO | 2013/181421 | A2 | 12/2013 |
| WO | 2014/003342 | A1 | 1/2014 |
| WO | 2014/012457 | A1 | 1/2014 |
| WO | 2014/013829 | A2 | 2/2014 |
| WO | 2014046578 | A1 | 3/2014 |
| WO | 2015/050405 | A1 | 4/2015 |
| WO | 2015/050406 | A1 | 4/2015 |
| WO | 2015/053382 | A1 | 4/2015 |

OTHER PUBLICATIONS

Office action received for corresponding Russian Patent Application No. 2016145084, dated Feb. 15, 2018, 6 pages of office action and no page of translation available.

Extended European Search Report received for corresponding European Patent Application No. 14889717.6, dated Dec. 6, 2017, 13 pages.

Office action received for corresponding Japanese Patent Application No. 2016-563030, dated Jan. 30, 2018, 4 pages of office action and 5 pages of translation available.

International Search Report and Written Opinion received for corresponding Patent Cooperation Treaty Application No. PCT/CN2014/075697, dated Jan. 28, 2015, 11 pages.

"3rd Generation Partnership Project; Technical Specification Group Services and System Aspects;Service requirements for the Evolved Packet System (EPS)(Release 12)", 3GPP TS 22.278, V12.2.0, Mar. 2013, pp. 1-42.

"Inter-Carrier and Inter-Cell Aspects of D2D Discovery and Communication", 3GPP TSG-RAN Working Group 1 meeting #76 bis, R1-141386, Agenda: 7.2.7.2.4, Ericsson, March 31-Apr. 4, 2014, pp. 1-5.

Office action received for corresponding Taiwan Patent Application No. 104112418, dated Apr. 27, 2016, 7 pages of office action and 4 pages of office action translation available.

Office action received for corresponding Vietnam Patent Application No. 1-2016-04257, dated Dec. 22, 2016, 1 page of office action and 1 page of office action translation available.

"Introduction of ProSe", 3GPP TSG-RAN2, meeting #89, R2-150734, Samsung, Feb. 9-13, 2015, pp. 1-89.

Jan. 8, 2019 Office Action issued in Japanese Patent Application No. 2016-563030.

European Office Action application No. 14 889 717.6 dated Oct. 28, 2018.

Notice of Final Rejection dated Mar. 15, 2019 corresponding to Korean Patent Application No. Oct. 2016-7032114.

Office Action issued in corresponding Vietnamese Patent Application No. Jan. 2016-04257, dated Jul. 15, 2019, with English translation.

Chinese Rejection Decision issued in corresponding Chinese Patent Application No. 201480078059.0, dated Dec. 26, 2019, with English summary thereof.

Notice of Reasons for Rejection issued in corresponding Japanese Patent Application No. 2018-139185, dated Aug. 29, 2019, with English translation.

Notification of Second Office Action issued in corresponding Chinese Patent Application No. 2014800780590, dated Aug. 23, 2019, with partial English translation.

Communication pursuant to Article 94(3) EPC issued in corresponding European Patent Application No. 14 889 717.6, dated Oct. 10, 2019.

Summons to attend oral proceedings pursuant to Rule 115(1) EPC issued in corresponding European Patent Application No. 14 889 717.6-1215, dated Jun. 18, 2020.

Substantive Examination Report issued in corresponding Philippines Patent Application No. 1/2016/502075 dated Oct. 27, 2020.

Final Office Action issued in corresponding Japanese Patent Application No. 2018-139185 dated Jul. 15, 2020, with English translation thereof.

Subsequent Substantive Examination Report issued in corresponding Philippines Patent Application No. 1/2016/502075 dated May 31, 2021.

Office Action issued in corresponding Vietnamese Patent Application No. 1-2021-00957 dated Sep. 28, 2021, with English translation thereof.

\* cited by examiner

INTER-OPERATOR DEVICE-TO-DEVICE OPERATION

RELATED APPLICATION

This application was originally filed as Patent Cooperation Treaty Application No. PCT/CN2014/075697 filed Apr. 18, 2014.

BACKGROUND

Field

Various communication systems may benefit from inter-operator device-to-device operation. For example, communication systems of the third generation partnership project (3GPP) long term evolution (LTE) advanced (LTE-A) release 12/13 (Rel-12/13) or future releases may use such operation with respect to D2D communications.

Description of the Related Art

A shared carrier frequency between a transmitter and a receiver can be a prerequisite for a communication link. In the case of inter-operator device-to-device (D2D) communication, the transmitter and receiver are user equipment (UEs) served by different operators in different carriers and/or bands according to conventional deployment approaches.

There are a few ways to let UEs served by different operators in different carriers and/or bands establish a D2D link on the same carriers/bands. Such ways of supporting the establishment of a D2D link may be useful in supporting inter-operator D2D operation, both in terms of discovery and communication.

One possible approach would be for two operators to share carriers and/or bands for inter-operators D2D communications. However, there may be spectrum regulation policies in cellular communications that prevent operators from sharing carriers and/or bands for a specific service.

Another option is for the UE to roam from one operator's network (NW) to another operator's NW to perform D2D. After UE roaming, inter-operator D2D will be operated in a similar or same way as intra-operator D2D, and consequently the same carriers and/or bands are used. This option is not conventionally possible with the current roaming agreement between operators. In addition, this option forces a UE to roam to another operator's NW even if it is within the coverage of its own serving operator. If roaming rules were changed and UEs were allowed to roam autonomously in order to support D2D, the following consequences may arise.

First, there may be a high roaming charge for the customer. A customer may be reluctant to accept such roaming charge just for the purpose of D2D communication. Second, there may be an uncontrolled load for the roamed-to operator, namely the operator whose resources may be used by the roaming D2D device. In other words, the roamed operator must manage the roaming UE's cellular link and traffic. That is an additional and uncontrollable burden for roamed operator.

The two consequences mentioned above can be partly solved if UEs are not allowed to roam freely just because of D2D but the roaming takes place under supervision of the two operators. Then, special roaming charges could be applied and the operators could agree on fair sharing of the load.

Such collaboration of operators, however, may not address the fact that disconnection from serving operator's network and connecting to roamed network may impact E-UTRAN services. In section 7A.1 of 3GPP technical specification (TS) 22.278, it is mentioned that "The effect of ProSe on the E-UTRAN services should be minimized." 3GPP TS 22.278 is hereby incorporated herein by reference in its entirety. Thus, these approaches may be inconsistent with 3GPP TS 22.278.

SUMMARY

According to certain embodiments, a method can include preparing, at a network element operated by an operator, radio resource information related to one or more operators other than the operator. The method can also include broadcasting, by the network element, the radio resource information. The radio resource information can be configured to permit a user equipment served by the network element to perform device-to-device discovery and/or communication with another user equipment served by at least one of the one or more operators.

In certain embodiments, a method can include preparing, at a user equipment, a discovery information message which may be used for device-to-device communication. Discovery can be an independent process to communication. It is not always the case that there is D2D communication link set up after D2D discovery. The method can also include broadcasting, by the user equipment, the discovery information message. The discovery information message can include discovery information related to intra-operator device-to-device operation and discovery information related to inter-operator device-to-device operation.

A method, according to certain embodiments, can include monitoring, by a user equipment, for a discovery information message which may be used for device-to-device communication. The method can also include initiating device-to-device communication based on the discovery information message. The monitoring can be limited to exclude discovery messages for inter-operator device-to-device communication or can include monitoring for discovery messages for both inter-operator device-to-device operation and intra-operator device-to-device operation.

A non-transitory computer-readable medium, in certain embodiments, can be encoded with instructions that, when executed in hardware, perform a process. The process can be any of the above-described methods.

According to certain embodiments, a computer program product can encode instructions for performing a process. The process can be any of the above-described methods.

In certain embodiments, an apparatus can include at least one processor and at least one memory including computer program code. The at least one memory and the computer program code can be configured to, with the at least one processor, cause the apparatus at least to prepare, at a network element operated by an operator, radio resource information related to one or more operators other than the operator. The at least one memory and the computer program code can also be configured to, with the at least one processor, cause the apparatus at least to broadcast, by the network element, the radio resource information. The radio resource information can be configured to permit a user equipment served by the network element to perform device-to-device discovery and/or communication with another user equipment served by at least one of the one or more operators.

An apparatus, according to certain embodiments, can include at least one processor and at least one memory including computer program code. The at least one memory and the computer program code can be configured to, with the at least one processor, cause the apparatus at least to prepare, at a user equipment, a discovery information message which may be used for device-to-device communication. The at least one memory and the computer program code can also be configured to, with the at least one processor, cause the apparatus at least to broadcast, by the user equipment, the discovery information message. The discovery information message can include discovery information which may be related to intra-operator device-to-device operation and discovery information related to inter-operator device-to-device operation.

An apparatus, in certain embodiments, can include at least one processor and at least one memory including computer program code. The at least one memory and the computer program code can be configured to, with the at least one processor, cause the apparatus at least to monitor, by a user equipment, for a discovery information message which may be used for device-to-device communication. The at least one memory and the computer program code can also be configured to, with the at least one processor, cause the apparatus at least to initiate device-to-device communication based on the discovery information message. The monitoring can be limited to exclude discovery messages for inter-operator device-to-device communication or can include monitoring for discovery messages for both inter-operator device-to-device operation and intra-operator device-to-device operation.

According to certain embodiments, an apparatus can include means for preparing, at a network element operated by an operator, radio resource information related to one or more operators other than the operator. The apparatus can also include means for broadcasting, by the network element, the radio resource information. The radio resource information can be configured to permit a user equipment served by the network element to perform discovery and/or device-to-device communication with another user equipment served by at least one of the one or more operators.

In certain embodiments, an apparatus can include means for preparing, at a user equipment, a discovery information message which may be used for device-to-device communication. The apparatus can also include means for broadcasting, by the user equipment, the discovery information message. The discovery information message can include discovery information related to intra-operator device-to-device operation and discovery information related to inter-operator device-to-device operation.

According to certain embodiments, an apparatus can include means for monitoring, by a user equipment, for a discovery information message which may be used for device-to-device communication. The apparatus can also include means for initiating device-to-device communication based on the discovery information message. The monitoring can be limited to exclude discovery messages for inter-operator device-to-device communication or can include monitoring for discovery messages for both inter-operator device-to-device operation and intra-operator device-to-device operation.

BRIEF DESCRIPTION OF THE DRAWINGS

For proper understanding of the invention, reference should be made to the accompanying drawings, wherein.

DETAILED DESCRIPTION

Certain embodiments may be related to proximity services (ProSe)/Device-to-Device (D2D) discovery and communication. More particularly, certain embodiments address how user equipment (UEs) can be served by different operators and still perform D2D discovery and communications.

In certain embodiments, a network (NW) element may broadcast radio resource information related to different operators, such as the public land mobile network (PLMN) identifier (id) of the operator and the frequency band(s)/carriers for which the operator supports inter-operator D2D operations. Not every operator may support inter-operator D2D operations. Thus, such information may be helpful in inter-operator D2D discovery and communication.

There can, in certain embodiments, be two types of discovery messages in discovery signals, which can be selected by the UE. One type of discovery message can contain information for both intra-operator and inter-operator D2D or other scenarios when applicable for example in case of partial coverage. This type can be referred to as Type 1. A discovery message of this type can contain information elements to support inter-operator D2D, such as UE capability and resource constraints. The UE capability may comprise information on frequency bands the UE supports. The UE capability may also comprise information on UEs ability to operate simultaneously on more than one band.

Another type of discovery message can include the information for intra-operator D2D only. This type of discovery message can be referred to as a Type 2 message. A discovery message of this type may not contain information for inter-operator operation.

Figure 1:
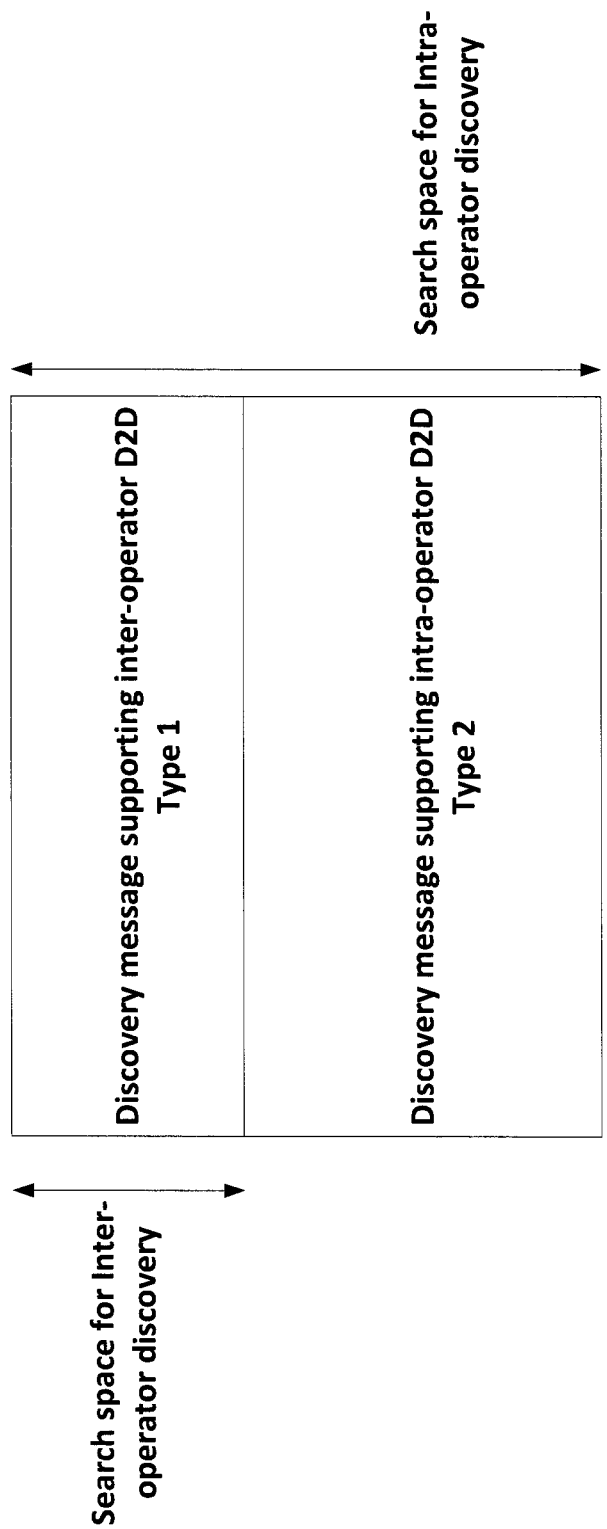
FIG. 1 illustrates resource allocation for device-to-device discovery messages, according to certain embodiments.

Such two or more types of discovery message can be allocated in different radio resources. For example, FIG. 1 illustrates resource allocation for device-to-device discovery messages, according to certain embodiments. As shown in FIG. 1, from the receiving UE point of view there can be separate search spaces for Type 1 discovery messages and for Type 2 discovery messages. Each operator may broadcast information about radio resource allocation for Type 1 and 2 signals, for example in a system information block (SIB).

The different types of discovery messages may also share same radio resources. Sharing could be complete in the sense that the radio resources used for a Type 1 and a Type 2 message are exactly of equal size but the information content of the messages are different. Type 1 and 2 messages would in this case be distinguished by different encoding or by different reference symbols. Different encoding could include different code rate, different scrambling of the information bits or different scrambling of cyclic redundancy check (CRC) bits.

Resource sharing could also be partial in the sense that Type 1 messages could consist of two parts, the first part being identical with Type 2 and the second part containing information that is relevant only for inter-operator discovery. Detection of a complete Type 1 message would be done with a two phase procedure: in the first phase, the message part with Type 2 content would be decoded and, in the second phase, the separately transmitted inter-operator discovery related part would be decoded. Some information from the first part could provide linking a second part to the first part. The linking could be based on the radio resources in such a way that the radio resource used for the first part would tell which resources decoding of the second part should be tried from. The linking could also be based on the content of the first part. As an example, the identity or part of the bits carrying an identity in the first part could be repeated in the second part. As another example, the identity or some of the bits carrying the identity in the first part could be used for scrambling the second part or its CRC bits so that the second part would be decodable after decoding of the first part and the decoding would be successful only with one second part. The benefit of transmitting the inter-operator discovery related information separately could optimize the resource use in case that some UEs, like UEs of an earlier standard release, would recognize only Type 2 messages, as without two part transmission, UEs of later standard release and supporting Type 1 messages would need to transmit Type 2 content twice i.e. once for UEs of the earlier releases and once for inter-carrier discovery.

When a UE tries to discover on another operator's band, the UE may only discover/detect the discovery message Type 1. By contrast, when the UE discovers on its serving operator's band, the UE can discover/detect both types of discovery message, namely both Type 1 and Type 2.

Figure 2:
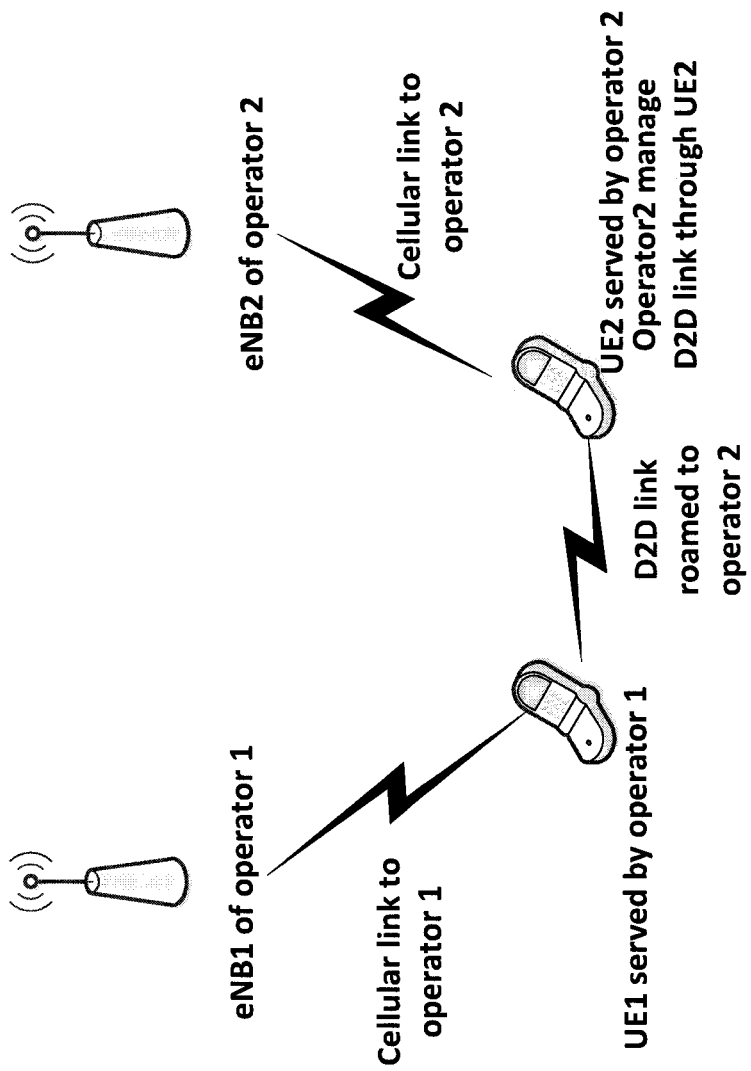
FIG. 2 illustrates a system architecture according to certain embodiments.

FIG. 2 illustrates a system architecture according to certain embodiments. As shown in FIG. 2, a connected-mode UE, such as UE1, can keep the UE's cellular link with the UE's serving operator, such as operator 1, while switching to the other operator's band for inter-operator D2D operation. The cellular link to operator 1 can be provided via eNB1. Likewise, UE2 can have a cellular link to operator 2 provided by eNB2. UE2 can communicate with UE1 over a D2D link that is roamed to operator 2, from the standpoint of UE1.

For time division multiplexing (TDM)-type switching for inter-operator D2D operation, the serving eNB can set UE specific resource constraints for inter-operator D2D, such as which subframe (SF) is available for inter-operator D2D. The UE can insert such resource constraints information in its discovery message.

For D2D communication, the UE can be scheduled by its D2D paired UE. In the example in FIG. 2, UE1 can be scheduled with respect to the D2D link by UE2, or more precisely by eNB2. In other words, the specific time-frequency radio resources used can follow scheduling decisions from the D2D paired UE. This can be applied to other scenarios as well. For example in case of partial coverage, the UE out of NW coverage can be scheduled by the in coverage UE which has more information about cellular resource usage to reduce the potential interference to cellular operation.

The scheduled UE may report the UE's own resource constraints configured by its serving eNB to its D2D paired UE at the beginning of D2D communication link establishment.

Thus, in certain embodiments only a D2D communication link of UE1 is switched to the other operator's NW and the cellular link can be always kept in the UE's home operator's NW.

In certain embodiments, for inter-operator discovery, the UE may only send discovery signal on its home operator's NW. Thus, in certain embodiments, the UE can completely avoid sending any discovery signal on any other operator's NW and band. This avoidance of transmission over another operator's network and band can avoid any regulation and/or charging concerns between different operators. Then the UE can switch to the other operator's band to discover or detect discovery signal of other operators' UEs or if supported, UE can keep two connections for both cellular operation and D2D discovery. For power-efficient discovery, it may be better to avoid a situation in which the UE takes a long time to search on other operators' bands for potential discovery signals to support inter-operator D2D. For example the discovery resource can be pre-defined or configured and inform each other between operators. Such information can be delivered to the D2D enabled UEs in the way of unicast, multicast or broadcast.

Figure 3:
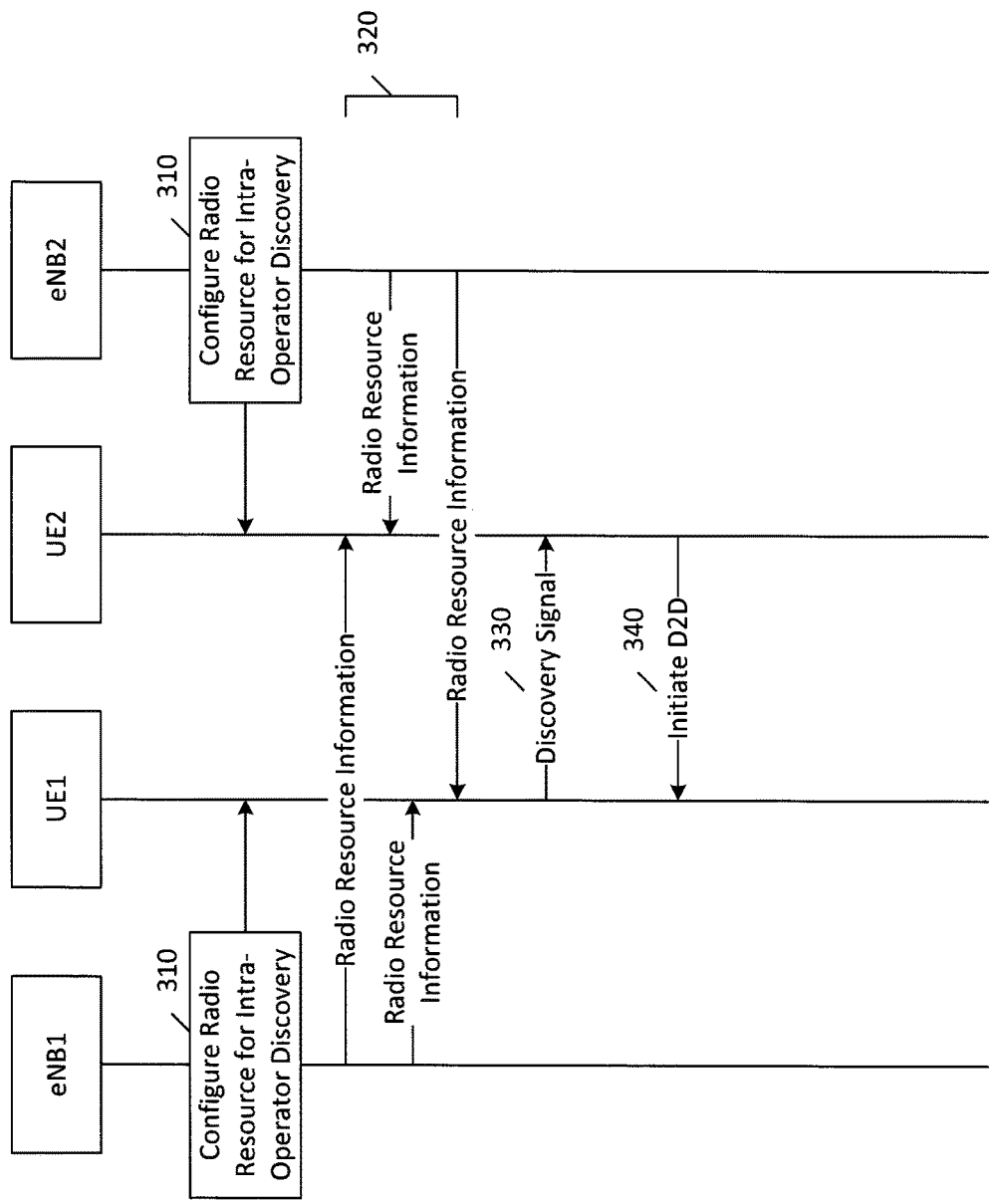
FIG. 3 illustrates a method and signal flow according to certain embodiments.

FIG. 3 illustrates a method and signal flow according to certain embodiments. As shown in FIG. 3, at 310, each NW (for example, eNB1 and eNB2) can configure a specific radio resource for inter-operator discovery. A UE supporting inter-operator D2D (for example, UE1) can, at 330, send a discovery signal on the configured resource. Furthermore, each operator can, at 320, broadcast such radio resource information in, for example, a SIB. Subsequently, optionally at 340, another UE (for example, UE2) can initiate D2D communication with UE1. D2D communication may not necessarily take place after D2D discovery.

When the UE (for example, UE2) starts the inter-operator D2D discovery, the UE can first sync to the other-operator's NW (for example, eNB1) and listen to the broadcasted messages (for example, SIB) and then find out the information on the specific radio resource for searching discovery signal.

When discovering on another operator's band, the UE may only discover/detect on the radio resource where discovery signals supporting inter-operator are allocated.

Inter-operator D2D communication can relate to UE capability, such as the UE ability to support different bands. To minimize the impacts from inter-operator D2D service to the cellular link or for other reasons, the eNB may set constraints on the available resource for inter-operator D2D. The UE can insert such UE capability information into its D2D discovery message, so that the discovering UE can obtain such information for D2D UE pairing. Thus, more particularly, the UE can insert its own UE capability information and resource constraints for inter-operator D2D operation into the discovery message it sends.

Such UE capability and resource constraints information may not be necessary for intra-operator D2D discovery. Thus, there can be at least two types of D2D discovery messages: one type for intra-operator discovery and that does not contain operator related information; and the other type for inter-operator discovery and that contains UE capability and resource constraints information.

A UE can avoid sending both types of discovery messages at the same time. Thus, the UE can select between Type 1 and Type 2 messages, as described above. Such two types of discovery message can be allocated in different radio resources, as shown in one example in FIG. 1. Each operator may broadcast such radio resource information, for example using SIB.

As mentioned above, when the UE tries to discover on another operator's band, the UE may only discover/detect the discovery message Type 1. On the other hand, when the UE discovers on its own serving operator's band, it can discover/detect both types of discovery message, both Type 1 and Type 2.

Thus, for example, a UE in discovery may treat other UEs equally for D2D purposes, without considering whether they are served by the UE's own network or roaming to the UE's network for D2D purposes.

For intra-operator discovery, the UE can just ignore UE capability and resource constraints related information. UE can follow some default rules to decide which type of message it will send. For example, if a UE has the capability of supporting inter-operator D2D, it can send such kind of discovery signal on the specified resource. Otherwise, it can just send a discovery signal for intra-operator discovery. Alternatively, the feature of whether to permit inter-operator D2D can be a user-configurable operation, for example in a settings menu of an operating system of the user equipment and/or the authorization from the operator.

When a discovering UE finds a proper D2D targeting UE, the UE can report to its serving eNB. Once two UEs are paired, the two operators can receive reports from the same pair of UEs. Then, both UEs can be informed from its respective home/serving operator and can go into the communication stage as discussed, for example, below.

For inter-operator D2D communication, one potential scenario is that the D2D link will be controlled by one operator's NW and D2D communication can take place in that same operator's band. Nevertheless, a cellular link can still connect each of the UEs to its respective home operator's NW. One example is shown in FIG. 2, in which UE1's D2D link switches to the other operator's NW/band while UE1's cellular link is still within its home operator.

Thus, the D2D switched UE can be scheduled by its D2D pair UE with respect to D2D communications. One example is in FIG. 2, in which UE1 is scheduled by UE2. But UE2 can still be scheduled by eNB2 of operator 2. An advantage of this arrangement may be that UE1 does not need to construct a cellular link to eNB2 just for getting scheduling information.

In certain embodiments, the D2D link can be under control of the eNB and the operator who operates the band. Thus, the effect of ProSe on the E-UTRAN services can be minimized. The available resource used for D2D can have some constraints, for example, only some SF available for D2D.

According to a first aspect, certain embodiments can insert a resource constraint into the discovery message. The serving eNB can notify the UE about such UE-specific resource constraints for inter-operator D2D. The UE can insert such information into the discovery message. Thus, resource constraint information can be obtained by the discovering UE and then helpful for proper inter-operator UE pairing. When operator manages inter-operator D2D link, it will follow the resource constraints obtained in the discovery message.

According to a second aspect, certain embodiments may comprise reporting the resource constraints using D2D link. Once two D2D UEs are paired, the eNB can indicate to D2D UEs the resource constraints. A D2D UE whose D2D link is switched can report or relay this constraint to its paired D2D UE(s) at the beginning of D2D link establishment.

Figure 4:
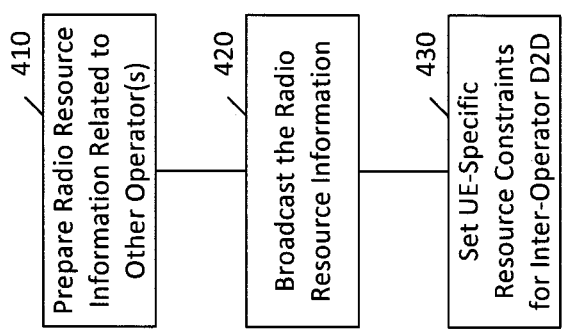
FIG. 4 illustrates a method according to certain embodiments.

FIG. 4 illustrates a method according to certain embodiments. At 410, the method can include preparing, at a network element operated by an operator, radio resource information related to one or more other operators. At 420, the method can include broadcasting, by a network element, the radio resource information. The radio resource information is configured to permit a user equipment served by the network element to perform device-to-device communication with another user equipment served by at least one of the one or more operators.

The radio resource information can include a public land mobile network identifier of the one or more operators and/or at least one operating frequency band of the one or more operators.

The method can also include, at 430, setting user-equipment-specific resource constraints for inter-operator device-to-device communication. The method can further include, at 440, scheduling device-to-device communications for a pair of user equipment including one user equipment having a different operator for cellular service.

Figure 5:
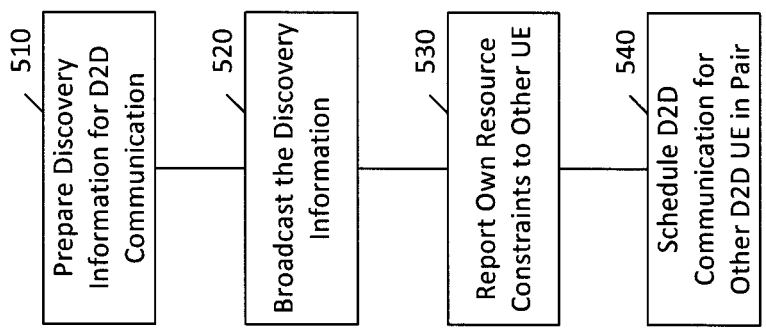
FIG. 5 illustrates another method according to certain embodiments.

FIG. 5 illustrates another method according to certain embodiments. The method can include, at 510, preparing, at a user equipment, a discovery information message, which may optionally be for device-to-device communication. The method can also include, at 520, broadcasting, by the user equipment, the discovery information message. The discovery information message can include discovery information related to intra-operator device-to-device communication.

The discovery information message can also include discovery information related to inter-operator device-to-device communication. For example, the discovery information message can be a type 1 message, as described above.

Alternatively, the discovery information message can exclude discovery information related to inter-operator device-to-device communication. For example, discovery information message can be a type 2 message, as described above.

The discovery information message can also include user equipment capability and resource constraint information. This information can be provided by the user equipment based on instructions received from a base station, such as an eNode B.

The discovery information message can be transmitted in an allocated radio resource, wherein the allocated radio resource is selected depending on whether it includes intra-operator device-to-device communication information.

The method can further include, at 530, reporting own resource constraints to another user equipment while beginning device-to-device communication link establishment with the another user equipment.

The method can additionally include, at 540, scheduling device-to-device communication for another user equipment while conducting device-to-device communication with the another user equipment.

Figure 6:
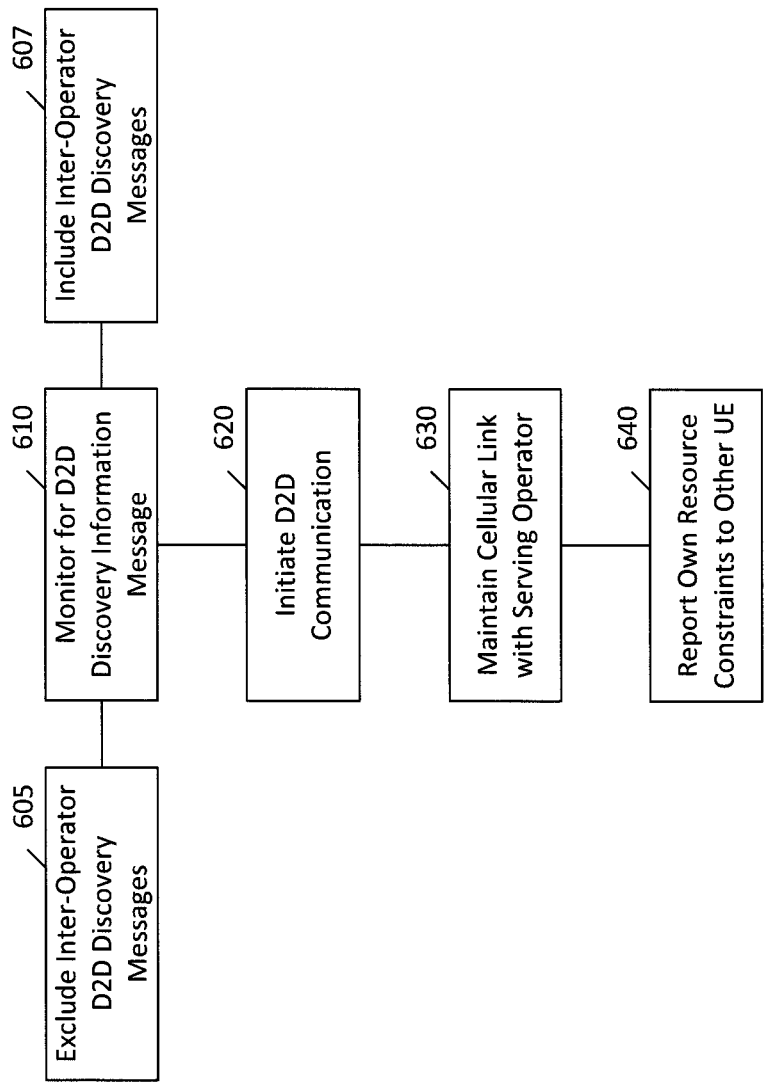
FIG. 6 illustrates a further method according to certain embodiments.

FIG. 6 illustrates a further method according to certain embodiments. As shown in FIG. 6, a method can include, at 610, monitoring, by a user equipment, for a discovery information message regarding device-to-device communication. The method can also include, at 620, initiating device-to-device communication based on the discovery information message.

The method can also include, at 605, limiting the monitoring to exclude discovery messages for inter-operator device-to-device communication. For example, the method can include monitoring only for type 2 messages. Alternatively, the method can include, at 607, monitoring for discovery messages which may be used for both inter-operator device-to-device communication and intra-operator device-to-device communication. For example, the method can include monitoring for both type 1 and type 2 messages. The monitoring can include searching an allocated radio resource depending on whether intra-operator device-todevice communication information is desired by the user equipment. Thus, for example, the search can be limited to a portion of the search space if only type 2 messages are of interest.

The method can also include, at 630, maintaining a cellular link with a serving operator of the user equipment while switching to another operator's band for inter-operator D2D operation.

The method can further include, at 640, reporting own resource constraints to another user equipment while beginning device to device communication link establishment with the another user equipment.

Figure 7:
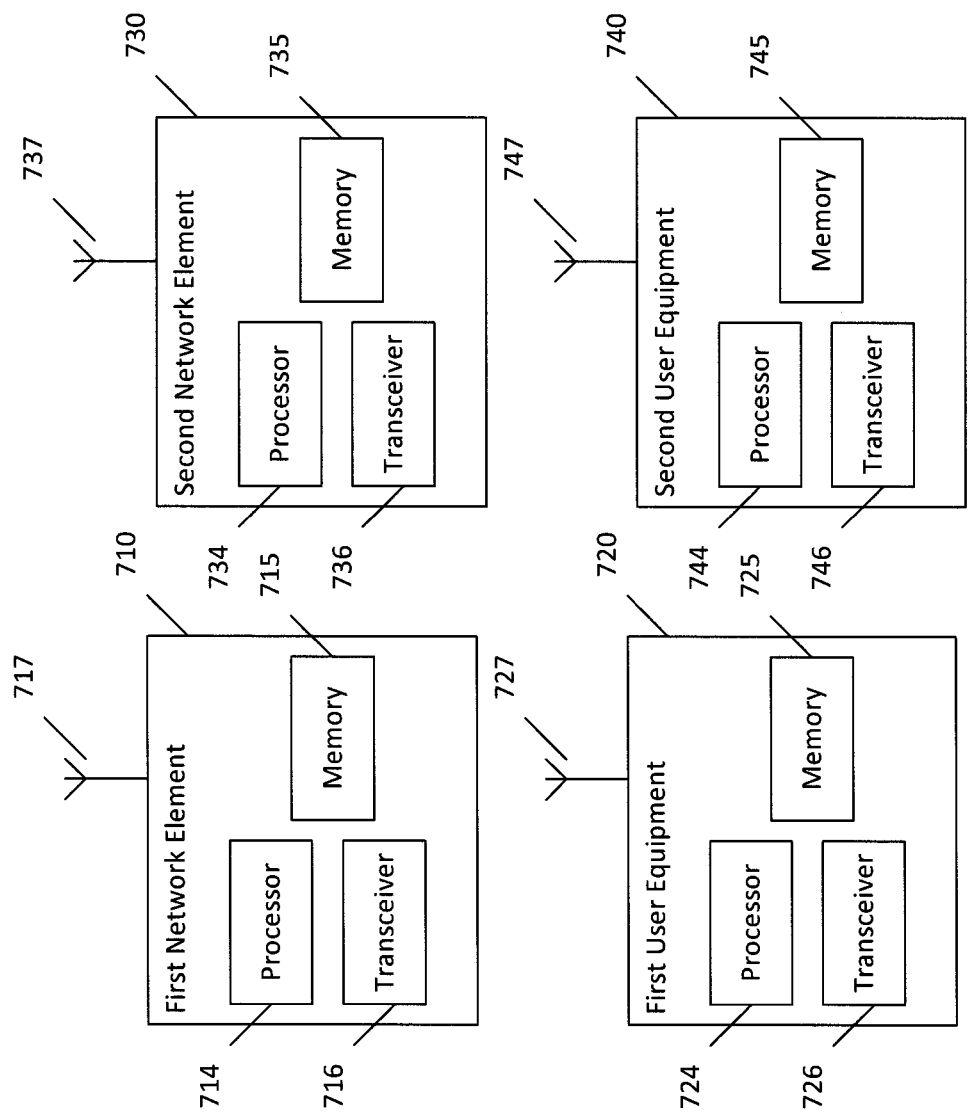
FIG. 7 illustrates a system according to certain embodiments.

FIG. 7 illustrates a system according to certain embodiments of the invention. In one embodiment, a system may include several devices, such as, for example, first network element 710, first user equipment 720, second network element 730, and second user equipment 740. The system may include more than two user equipment 720, 740 and more than two network elements 710, 730, although only one of each is shown for the purposes of illustration. Each of these devices may include at least one processor, respectively indicated as 714, 724, 734, and 744. At least one memory may be provided in each device, and indicated as 715, 725, 735, and 745, respectively. The memory may include computer program instructions or computer code contained therein. One or more transceiver 716, 726, 736, and 746 may be provided, and each device may also include an antenna, respectively illustrated as 717, 727, 737, and 747. Although only one antenna each is shown, many antennas and multiple antenna elements may be provided to each of the devices. Other configurations of these devices, for example, may be provided. For example, first network element 710, first user equipment 720, second network element 730, and second user equipment 740 may be additionally configured for wired communication. In such a case antennas 717, 727, 737, and 747 may illustrate any form of communication hardware, without being limited to merely an antenna. For example, antennas 717, 727, 737, and 747 may illustrate any form of wired communication hardware, such as a network interface card.

Transceivers 716, 726, 736, and 746 may each, independently, be a transmitter, a receiver, or both a transmitter and a receiver, or a unit or device that may be configured both for transmission and reception.

Processors 714, 724, 734, and 744 may be embodied by any computational or data processing device, such as a central processing unit (CPU), application specific integrated circuit (ASIC), or comparable device. The processors may be implemented as a single controller, or a plurality of controllers or processors.

Memories 715, 725, 735, and 745 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as first network element 710, first user equipment 720, second network element 730, and second user equipment 740, to perform any of the processes described above (see, for example, FIGS. 3-6). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 7 illustrates a system including first network element 710, first user equipment 720, second network element 730, and second user equipment 740, embodiments of the invention may be applicable to other configurations, and configurations involving additional elements, as illustrated and discussed herein (see, for example, FIGS. 1-3).

Certain embodiments may have various benefits and/or advantages. For example, for inter-operator discovery, certain embodiments may not involve any transmission on another operator's NW or band. Additionally, certain embodiments provide an efficient discovery procedure. For inter-operator communication, certain embodiments do not require switch of the cellular link to other operator's NW and band/carrier.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A first user equipment, comprising:
at least one processor; and
at least one memory including computer program code,
wherein the at least one memory and the computer program code are configured to, with the at least one processor, cause the first user equipment at least to
prepare a discovery information message;
broadcast the discovery information message,
wherein the discovery information message comprises discovery information related to intra-operator device-to-device operation, and discovery information related to inter-operator device-to-device operation; and
transmit scheduling decisions, from the first user equipment to a second user equipment via a device-to-device link established based on the discovery information message, for the inter-operator device-to-device operation with the second user equipment, wherein the second user equipment keeps a cellular link to a respective operator of the second user equipment.

2. The first user equipment of claim 1, wherein the discovery information message comprises user equipment capability and resource constraint information.

3. The first user equipment of claim 1, wherein the at least one memory and the computer program code are configured to, with the at least one processor, cause the first user equipment at least to report own resource constraints to the second user equipment while beginning device-to-device communication link establishment with the second user equipment.

4. The first user equipment of claim 1, wherein the at least one memory and the computer program code are configured to, with the at least one processor, cause the first user equipment at least to schedule device-to-device communication for the second user equipment while conducting the device-to-device communication with the second user equipment.

5. The first user equipment of claim 1, wherein the at least one memory and the computer program code are configured to, with the at least one processor, cause the first user equipment at least to communicate with the second user equipment by said inter-operator device-to-device operation, while the first user equipment and the second user equipment keep respective cellular links with their respective serving operators.

6. The first user equipment of claim 1, wherein the at least one memory and the computer program code are configured to, with the at least one processor, cause the first user equipment at least to prepare another discovery message comprising discovery information related to intra-operator device-to-device operation without including discovery information related to inter-operator device-to-device operation; and broadcast said another discovery message on a different radio resource to the discovery message comprising discovery information related to inter-operator device-to-device operation and discovery information related to intra-operator device-to-device operation.

7. A user equipment, comprising:
at least one processor; and
at least one memory including computer program code,
wherein the at least one memory and the computer program code are configured to, with the at least one processor, cause the user equipment at least to
detect a discovery information message broadcast from another user equipment having a cellular link to a second serving operator different from a first serving operator serving the user equipment, wherein the discovery information message comprises discovery information related to inter-operator device-to-device operation, and discovery information related to intra-operator device-to-device operation, and
switch to a band of the second serving operator for inter-operator device-to-device operation and following scheduling decisions for the inter-operator device-to-device operation from the another user equipment via a device-to-device link established based on the discovery information message, while the user equipment keeps a cellular link to the first serving operator.

8. The user equipment of claim 7, wherein the at least one memory and the computer program code are configured to, with the at least one processor, cause the user equipment at least to report own resource constraints to the another user equipment while beginning device-to-device communication link establishment with the another user equipment.

9. The user equipment of claim 7, wherein the at least one memory and the computer program code are configured to, with the at least one processor, cause the user equipment at least to communicate with the another user equipment by said inter-operator device-to-device operation, while said user equipment and the another user equipment keep respective cellular links with their respective serving operators.

10. The user equipment of claim 7, wherein the at least one memory and the computer program code are configured to, with the at least one processor, cause the user equipment at least to identify, from information broadcast from the first serving operator, the second serving operator supports inter-operator device-to-device operation.

11. The user equipment of claim 10, wherein the at least one memory and the computer program code are configured to, with the at least one processor, cause the user equipment at least to identify, from messages broadcast from said second serving operator, a radio resource for one or more user equipment having a cellular link to the second serving operator to broadcast discovery information messages related to inter-operator device-to-device operation.

12. The user equipment of claim 7, wherein the at least one memory and the computer program code are configured to, with the at least one processor, cause the user equipment at least to search for discovery information messages comprising discovery information related to inter-operator device-to-device operation and discovery information related to intra-operator device-to-device operation in a first search space; and search for discovery information messages comprising discovery information related to intra-operator device-to-device operation without including discovery information related to inter-operator device-to-device operation, in a second search space separate from said first search space.

13. A method, comprising:
preparing, at a user equipment, a discovery information message;
broadcasting, by the user equipment, the discovery information message,
wherein the discovery information message comprises discovery information related to intra-operator device-to-device operation, and discovery information related to inter-operator device-to-device operation; and
transmitting scheduling decisions, from the user equipment to another user equipment via a device-to-device link established based on the discovery information message, for the inter-operator device-to-device operation with the another user equipment wherein the another user equipment keeps a cellular link to a respective operator of the another user equipment.

14. The method of claim 13, wherein the discovery information message comprises user equipment capability and resource constraint information.

15. The method of claim 13, further comprising reporting own resource constraints to the another user equipment while beginning device-to-device communication link establishment with the another user equipment.

16. The method of claim 13, further comprising scheduling device-to-device communication for the another user equipment while conducting the device-to-device communication with the another user equipment.

17. The method of claim 13, further comprising communicating with the another user equipment by said inter-operator device-to-device operation, while the user equipment and the another user equipment keep respective cellular links with their respective serving operators.

18. The method of claim 13, further comprising preparing at said user equipment another discovery message comprising discovery information related to intra-operator device-to-device operation without including discovery information related to inter-operator device-to-device operation; and broadcasting said another discovery message from said user equipment on a different radio resource to the discovery message comprising discovery information related to inter-operator device-to-device operation and discovery information related to intra-operator device-to-device operation.

19. A method, comprising:
detecting, by a first user equipment having a cellular link to a first serving operator, a discovery information message broadcast from a second user equipment having a cellular link to a second serving operator different from the first serving operator, wherein the discovery information message comprises discovery information related to inter-operator device-to-device operation, and discovery information related to intra-operator device-to-device operation, and switching to a band of the second serving operator for inter-operator device-to-device operation and follow scheduling decisions for the inter-operator device-to-device operation from the second user equipment via a device-to-device link established based on the discovery information message, while the first user equipment keeps the cellular link to the first serving operator.

20. The method of claim 19, further comprising: communication with the second user equipment by said inter-operator device-to-device operation, while said first and second user equipment keep respective cellular links with their serving operators.

* * * * *